UNITED STATES PATENT OFFICE.

RALPH D. MERSHON, OF NEW YORK, N. Y.

FILM-COATED METALLIC ARTICLE AND METHOD OF MAKING THE SAME.

1,065,704. Specification of Letters Patent. Patented June 24, 1913.

No Drawing. Application filed December 21, 1911. Serial No. 667,200½.

*To all whom it may concern:*

Be it known that I, RALPH D. MERSHON, a citizen of the United States, residing at New York, county and State of New York, have invented certain new and useful Improvements in Film-Coated Metallic Articles and Methods of Making the Same, of which the following is a full, clear, and exact description.

As is well known, utensils and other devices made of aluminum, tantalum, magnesium, and similar metals are for certain purposes improved by providing the same, or parts thereof, with a protective coating or film, which coating or film serves to protect the underlying metal from injury or deterioration; or to protect materials in contact with the utensil or device from contamination or other deleterious effects which might follow from direct contact with the metal; or both. For example, aluminum cooking utensils are extensively used. In cooking certain substances it is found that the contents of the utensil are apt to stick to the metal and hence give trouble in cleaning the pot or pan in which the cooking is performed. If, however, the inside of the utensil is coated with the protective film referred to, the objectionable sticking will not occur or will be greatly diminished, so that cleansing with water becomes an easy matter. Film-coated articles are also used in the electrical arts, for example film-coated wires of aluminum, and electrodes for various purposes, the film serving to insulate the wires, to protect the underlying metal of the electrodes from electrolytic action, etc. It has been observed, however, that these protecting films are very sensitive to temperature. That is, as the temperature to which it is subjected increases, the film becomes less and less effective, and eventually, under some circumstances, very quickly becomes practically useless. I have therefore been led to devise my present invention, which has for its chief object to provide an article having a firm and dense film which shall possess a temperature resistance such as to permit the article to be subjected to the high temperature often met with in actual use of the article, without serious impairment of the protective or other properties of the film. For example, an aluminum cooking utensil embodying my invention in the preferred manner, can be used at boiling temperature and the film or coating will still retain admirably the protective properties desired, while at lower temperatures it will be found to possess these properties in a higher degree than other films at the same or even still lower temperatures. Similarly in the electrical arts: film produced on a conductor according to my invention has a higher degree of durability than has any prior film with which I am familiar; while in an electrolytic apparatus my improved electrodes are incomparably superior to prior devices for the same purpose, as regards the dielectric strength and specific resistance of the film, and are able to withstand temperatures that would render other films useless in a very short time.

My invention may be practised in various ways. Preferably, I proceed as follows: The article, for example an aluminum cooking vessel, is formed in the usual manner, as by casting, pressing, drawing or spinning, and is preferably given a smooth, though not necessarily a polished, surface. The surface to be coated (in the present case the inner surface) should, for the best results, be chemically clean. The vessel is now filled, as far up as the film is to extend, with a solution (preferably saturated) of borax or other suitable film-producing agent and the vessel is itself connected with one terminal of a source of electric current, either alternating or direct, at a suitable voltage, as will be explained hereinafter. The other terminal is connected to the borax solution, as by means of an electrode immersed therein, which electrode may be of almost any material, as for example carbon, lead or iron when direct current is used. With alternating current the electrode should, in general, be of the same metal as the article being treated and its surface should be substantially the same in extent as that which is to be coated with the film. If direct current is used, the vessel should be connected to the positive pole of the source and the borax solution to the negative pole. Of course the electrode used should in no case come in electrical contact with the vessel. The solution being at boiling temperature (preferably under pressure, so that the actual temperature will be higher than the boiling point at atmospheric pressure), the current is turned on. If a suitable measuring or indicating instrument, for example an ammeter when direct current is used, or a wattmeter when the current is alternating, is connected in the circuit it will be found that the current flowing begins to fall in value shortly after the circuit is closed. This fall is at first rapid, then less and less rapid, until a point is reached where the decrease is almost, if not entirely, imperceptible. The circuit can now be opened and the boiling solution poured out of the vessel. Or the solution may first be allowed to cool, with or without the current being continued during all or part of the time of cooling. On examining the interior of the vessel it will be found coated with a closely adherent film, harder than the metal on which it is formed and less subject to scratching and abrasion, resistant to acids, and in color varying from bronze or greenish bronze to brownish bronze. At low temperatures the film will be found superior, in all its properties, to prior films for similar purposes, while at high temperatures, for example boiling, my film will be highly effective and will retain its effectiveness until the film itself is worn off the vessel by continued use and washing.

As stated above, I prefer to start the formation of the film with the film-producing material (in the present instance the borax solution) at boiling temperature, but this is not essential. Instead, the solution may be cold at the start and have its temperature raised as the formation of the film goes on. It is desirable, however, that the solution be boiling when the forming current is cut off, as the agitation caused by the boiling prevents bubbles adhering to the article. These bubbles, if allowed to remain, apparently prevent the complete development of the film under the bubbles, with the result that in after use the film has less durability at such points. If the solution does not begin to boil until about the time the forming current reaches its minimum value, the process should be continued, with the solution boiling, for some time, to insure that any points that may have been protected by bubbles may be as heavily coated as the rest.

In making electrodes for use in condensers, rectifiers and other electrolytic apparatus, I employ preferably a crimped or corrugated plate. For instance, I take a piece of sheet aluminum of suitable size and thickness and fold or crimp the piece so as to produce V-shaped corrugations. A plate of this form is particularly difficult to coat with a good film, as the bubbles resulting from the electrolytic action in the bath find lodgment in the grooves in the plate and do not float off readily. Accordingly I am careful, in treating such plates, or in fact any article having crevices or other parts which might facilitate adherence of the bubbles, to have the bath boiling briskly for some time before the current is turned off. Preferably I have the bath boiling when the current is turned on and keep it boiling throughout the treatment. The corrugated plate is placed in the bath, and is connected with the source of current, which source is also connected with the bath by means of a suitable electrode. The current is now turned on and the indicating or measuring instrument is watched. When the instrument, ammeter or wattmeter as the case may be, shows that the current has fallen to about its minimum value, the process may be terminated, though no harm will be done by continuing the treatment. On the contrary, continuing the treatment after the current has about reached its minimum value rather improves the results. On removing the crimped plate from the bath it will be found to be coated with a film of the same character as that on the vessel described above. This film possesses remarkable di-electric strength, specific resistance and inductive capacity, and can be used in electrolytic apparatus operating at high temperatures without material impairment of these properties. For example, in an electrolytic condenser the temperature may, on account of the losses in the condenser, rise to 60° C. or even higher. At such temperature a film produced according to prior methods would in a few hours become wholly worthless, and not only would the efficiency of the condenser fall to a low point, but the electrodes would suffer rapid corrosion and eventual destruction. But with my improved electrode used in a suitable apparatus only a very slight, if any, impairment of the efficiency of the condenser, on account of rise of temperature, will be noticed, even after long and continuous use, while the corrosion of the electrodes incident to the increase of temperature will be negligible. The thickness of films thus produced electrolytically is believed to depend almost directly upon the final voltage employed in its formation, up to a certain limiting voltage the value of which is dependent upon the metal and the film-producing agent used in connection with it. In general, this limiting voltage evidences itself by the fact that if it or a higher voltage be maintained the value of the current flowing does not fall, or falls very little. In practice I prefer to start with a low voltage, and then increase the same from time to time as the film builds up, as evidenced by decrease of the current. The formation of the film is expedited by acidulating the bath with one or another of the acids whose salts may be used as film producing agents, as for example boric, or phosphoric, acid, etc. The amount of acid used may be varied according to circumstances but I have secured good results with a bath made up in the proportion of two gallons of the saturated borax solution, three pounds of boric acid, and an additional half-pound of borax.

The film which characterizes my present invention is believed to be composed in part of the metal on which it is formed, in chemical combination with one or more of the elements composing the bath. Thus in the case of aluminum treated in a borax solution, the film is composed in part of aluminum. I am not certain what the other constituent or constituents are; but careful analysis indicates that the film is a form of aluminum hydrate, or is composed largely of aluminum hydrate. The film itself is exceedingly thin; but nevertheless it possesses remarkable durability under the most adverse conditions, particularly in respect to temperature.

An application of the principles underlying my invention is described in my copending application Serial No. 536,542, filed January 5, 1910, now Patent No. 1,012,889, issued December 26, 1911.

What I claim is:—

1. As a new article of manufacture, a metallic article having on its surface a protective coating or film composed, in part of the underlying metal and characterized by high density, close and firm adherence to the metal, resistance to the attack of acids, possessing high dielectric strength and specific resistance, and capable of withstanding high temperatures without substantial impairment.

2. As a new article of manufacture, a metallic article having on its surface a dense, closely adherent coating or film possessing high dielectric strength, specific resistance, and capability of resisting electrolytic attack at high temperatures, said coating or film being composed in part of the underlying metal in chemical combination with another element or elements.

3. As a new article of manufacture, an aluminum article having on its surface a dense closely adherent film or coating composed in part of aluminum in chemical combination with another element or elements, characterized by high dielectric strength and specific resistance, and capable of withstanding electrolytic attack at high temperatures.

4. As a new article of manufacture, a metallic electrode having on its surface a dense, closely adherent, durable film or coating composed in part of the underlying metal, possessing high dielectric strength and specific resistance, and capable of maintaining its dielectric and resistant properties substantially unimpaired as the temperature increases in the apparatus in which the electrode is used.

5. As a new article of manufacture, an aluminum electrode having on its surface a dense, closely adherent, durable film or coating composed in part of aluminum, possessing high dielectric strength and specific resistance, and capable of maintaining its dielectric and resistant properties substantially unimpaired as the temperature increases in the apparatus in which it is used.

6. The herein described method of producing metallic articles with a protective film of the kind described, which consists in forming the article of suitable metal, subjecting the article to a film-producing bath, and passing an electric current through the article and the bath at a temperature adapted to impart marked temperature-resistant properties or characteristics to the resultant film.

7. The herein described method of producing metallic articles with a protective film of the kind described, which consists in forming the article of suitable metal, subjecting the article to a film-producing bath, and passing an electric current through the article and the bath at boiling temperature whereby to impart marked temperature-resistant properties or characteristics to the resultant film.

8. The herein described method of producing metallic articles with a protective film of the kind described, which consists in forming the article of suitable metal, subjecting the article to a boiling bath containing a film-producing agent, and passing an electric current through the article and the bath.

9. The herein described method of producing metallic articles with a protective film of the kind described, which consists in forming the article of suitable metal, subjecting the article to a boiling bath containing a film-producing agent, and passing an electric current through the article and the bath while keeping the bath boiling.

In testimony whereof I affix my signature in the presence of two subscribing witnesses.

RALPH D. MERSHON.

Witnesses:
S. S. DUNHAM,
M. LAWSON DYER.